United States Patent [19]

Boehm

[11] 3,890,933

[45] June 24, 1975

[54] HAYING FEEDER

[76] Inventor: Edward Boehm, Rural Rte. 1, Mandan, N. Dak. 58554

[22] Filed: Mar. 1, 1974

[21] Appl. No.: 447,068

Related U.S. Application Data

[63] Continuation-in-part of Ser. No. 339,208, March 8, 1973, abandoned.

[52] U.S. Cl. ............................................ 119/60

[51] Int. Cl. ............................................ N01k 5/00

[58] Field of Search ................ 119/60, 58, 52 R, 53; 220/71, 72; 280/408

[56] References Cited

UNITED STATES PATENTS

| | | | |
|---|---|---|---|
| 3,067,723 | 12/1962 | Norwood | 119/60 X |
| 3,353,615 | 11/1967 | Nekimken | 220/72 X |
| 3,782,333 | 1/1974 | Feterl | 119/58 X |

*Primary Examiner*—Louis G. Mancene
*Assistant Examiner*—J. N. Eskovitz
*Attorney, Agent, or Firm*—Gordon L. Peterson

[57] ABSTRACT

A haying feeder adapted to hold at least one large bale of hay comprising a peripheral wall circumscribing a space into which the bale can be deposited. The space has a completely open upper end to permit the bale to be deposited in the space from above. The peripheral wall includes first and second sidewalls with each of the sidewalls including a plurality of strong structural sections. Each of the structural sections has an inner surface which slopes inwardly as it extends downwardly. The inner surfaces of the structural sections are adapted to engage and at least partially support the bale in the bale receiving space. The peripheral wall has a plurality of openings of sufficient size to make the bale in the haying feeder accessible to livestock.

11 Claims, 5 Drawing Figures

HAYING FEEDER

REFERENCE TO COPENDING APPLICATION

This application is a continuation-in-part of application Ser. No. 339,208 filed on Mar. 8, 1973, entitled MODERN HAYING FEEDER, and naming Edward Boehm as the sole inventor, now abandoned.

BACKGROUND OF THE INVENTION

A haying feeder is used as a container for hay as well as a feeding device for feeding hay to livestock. U.S. Pat. No. 3,067,723 issued to Norwood shows a haying feeder which is adapted to contain loose hay. The peripheral wall of the feeder has openings to permit livestock to be fed directly from the feeder.

In recent years it has become possible to put up hay in extremely large bales weighing, for example, 1500 lbs. Unfortunately, prior art haying feeders are not adapted for use with these large bales. For example, prior art feeders lack the requisite strength to adequately support the large bales and contain supports which extend across the top of the hay receiving space. These supports restrict access to the hay receiving space and preclude these feeders from being used with extremely large bales.

SUMMARY OF THE INVENTION

The present invention provides a haying feeder which is adapted for use with the extremely large bales of hay. However, the haying feeder of this invention can also be used with loose hay, small bales, or other kinds of feed.

The concepts of this invention are applicable to a haying feeder which includes a peripheral wall at least substantially circumscribing a bale receiving space. The upper end of the bale receiving space is completely open to permit the bale to be deposited into the space from above. In other words, bale receiving space does not have any supports extending across its upper end to prevent the deposit of large bales into the feeder.

The peripheral wall includes first and second generally opposed wall portions and such wall portions may be sidewalls. In order to provide some of the strength necessary to retain a very large bale, each of the sidewalls includes at least one structural section having an inner surface. The inner surfaces of the structural sections can advantageously be utilized to engage and at least partially support the bale. To accomplish this, each of the inner surfaces slopes inwardly as it extends downwardly. In other words, the inner surfaces of opposed structural sections taper toward each other to grip the bale with a wedging-type action. This not only supports the bale when the feeder is not moving, but also supports the bale against dynamic forces when the haying feeder is being used to transport the bale.

The peripheral wall has a plurality of openings with each of the openings being of sufficient size to receive the head of livestock. Thus, the openings make the bale in the bale receiving space accessible to livestock. Although the openings can be provided in various ways, one convenient way is to provide one or more of the openings between adjacent structural sections.

Each of the structural sections can advantageously take the form of a wedge. In this event, the inner surface of the structural section can be defined by the apex of the wedge. With this construction, the inner surface is relatively narrow and somewhat sharp with the result that the wedge cuts into or interlocks with the bale to securely hold the bale in position during transport and feeding.

Different forms of construction can be employed to obtain a wedge of the type used with the haying feeder of this invention. One preferred form of wedge includes first and second plates at least substantially engaging along confronting edges to define the apex of the wedge. The plates are not vertical but slope away from each other as they extend downwardly to provide mutual support and maximum strength adjacent the lower edges thereof.

The upper regions of the bale in the haying feeder are too high to be reached by livestock. Accordingly, the livestock feed through the openings in the peripheral wall. As hay along the lower regions of the bale is consumed, the sloping inner surfaces allow the bale to gradually move downwardly. This maintains a continuous supply of baled hay adjacent the opening and prevents sudden downward movements of the very heavy bale.

The two sidewalls are held together by strong structural end walls and by one or more cross braces extending between the sidewalls. Any cross brace provided preferably has its upper edge lying substantially beneath the open upper end of the bale receiving space so as not to interfere with the deposit of a bale into the space. A floor in the haying feeder is optional.

In a preferred construction each of the sidewalls includes an upper railing, a strong base beneath the upper railing, and a plurality of the wedges coupled to and extending between the upper railing and the base. The wedges are spaced apart, and if desired, one or more structural members may project generally vertically from the upper railing to the base intermediate an adjacent pair of the wedges. With this construction, the inner surfaces of the wedges will extend inwardly beyond the inner surfaces of the intermediate structural members. Each of the end walls may also include an upper railing and generally vertical structural members or posts spaced apart to define more of the openings.

Unlike some prior art units, the haying feeder of this invention can be mounted on wheels and used for transporting baled hay. The haying feeder is preferably constructed entirely of welded metal construction. The haying feeder may also be modular so that feeders of any desired length can be provided by simply interconnecting an appropriate number of modules.

The invention can best be understood by reference to the following description taken in connection with the accompanying illustrative drawing.

DESCRIPTION OF THE PREFERRED EMBODIMENT

Figure 1:
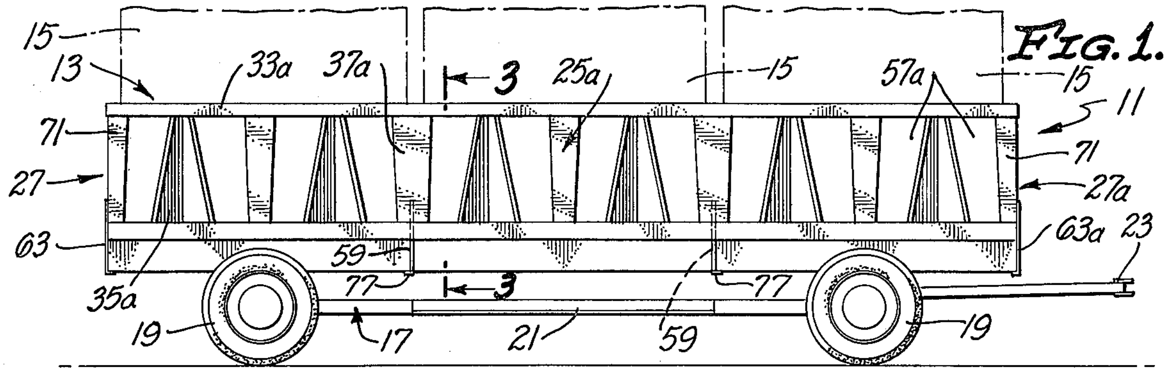
FIG. 1 is a side elevational view of a haying feeder constructed in accordance with the teachings of this invention.
Figures 2, 3:
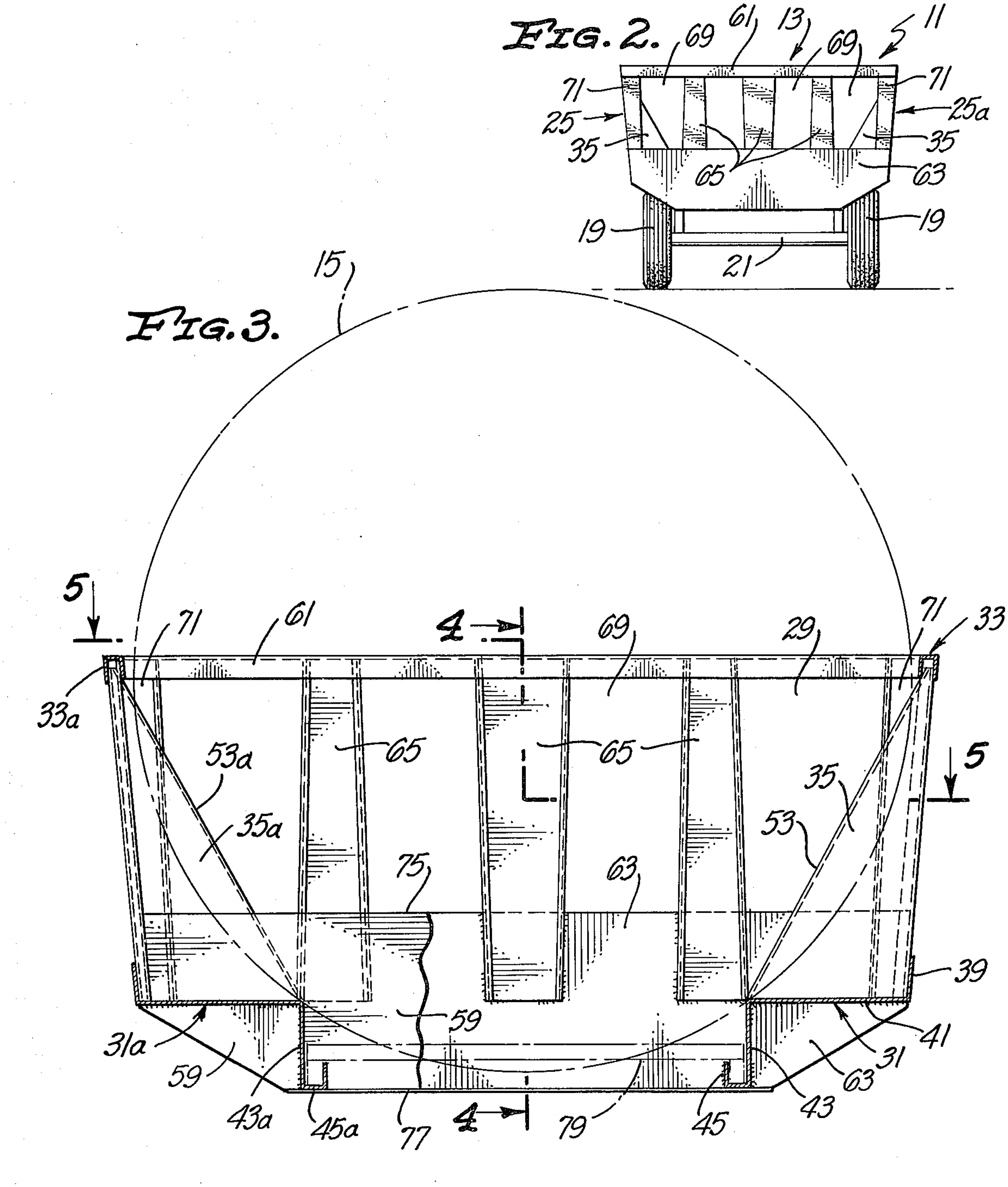
FIG. 2 is an end elevational view of the haying feeder taken from the back of the haying feeder.
FIG. 3 is an enlarged sectional view taken generally along line 3—3 of FIG. 1.

FIGS. 1 and 2 show a haying feeder 11 which includes a container 13 for one or more bales 15 (FIGS. 1 and 3) suitably mounted in any conventional manner on a trailer 17 of conventional construction. The trailer 17 includes four wheels 19 mounted on a frame 21 and a tongue 23 which permits the haying feeder 11 to be pulled behind a suitable vehicle such as a tractor or truck.

Figure 5:
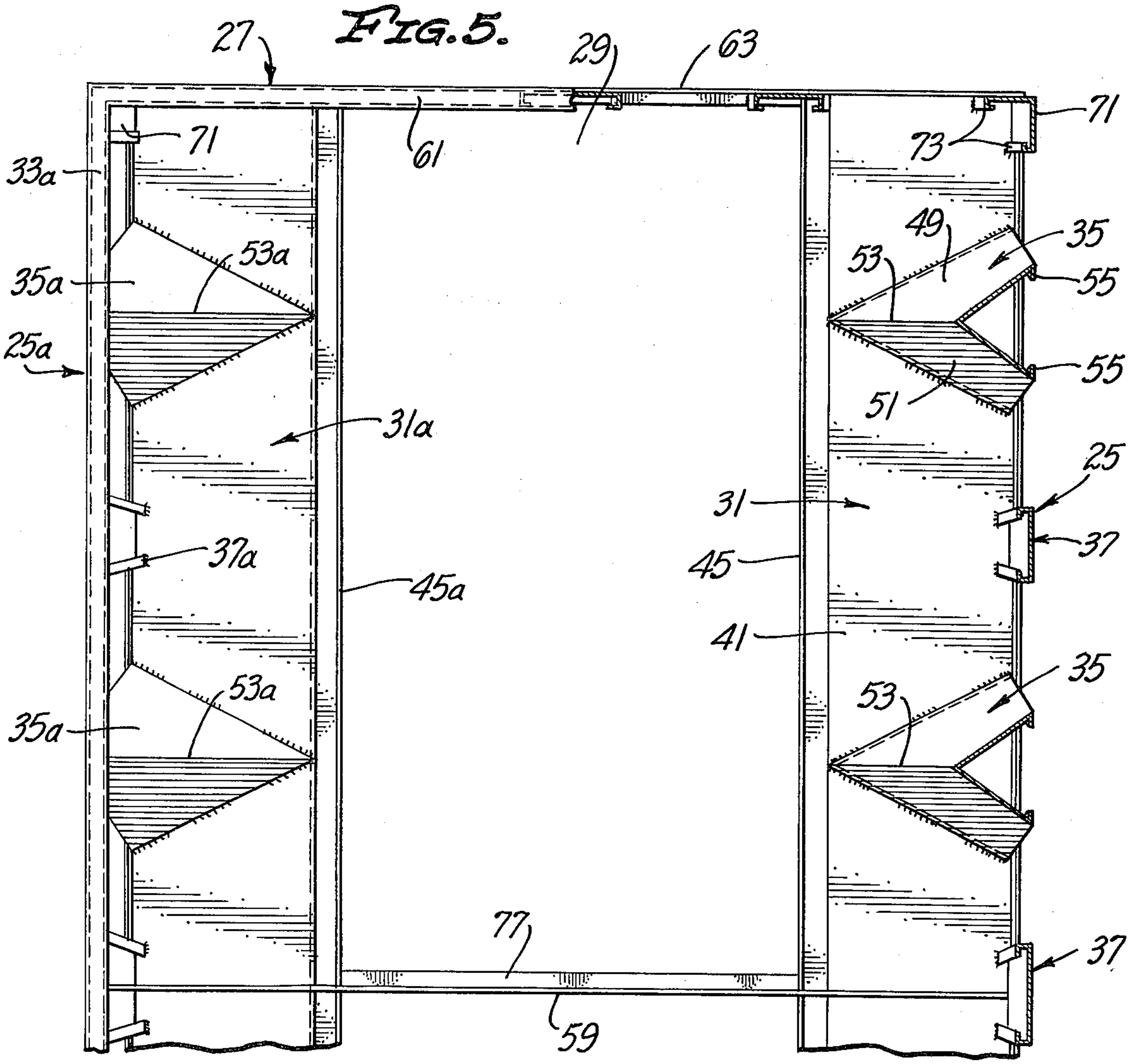
FIG. 5 is a fragmentary sectional view taken generally along line 5—5 of FIG. 3.

No bolts or other fasteners are necessary for the container 13 as it can be made entirely of welded steel construction. The container 13 includes spaced sidewalls 25 and 25*a* (FIG. 5), a back end wall 27, and a front end wall 27*a*. The sidewalls and end walls define a peripheral wall which circumscribes a bale receiving space 29 (FIGS. 3 and 5). The sidewalls 25 and 25*a* may be of different construction; however, in the embodiment illustrated, the sidewalls are identical. Similarly, the end walls 27 and 27*a* may be of different construction; however, in the embodiment illustrated, they are identical. Accordingly, portions of the sidewall 25*a* and the end wall 27*a* corresponding to portions of the sidewall 25 and the end wall 27, respectively, are designated by corresponding reference numerals followed by the letter *a*.

Figure 4:
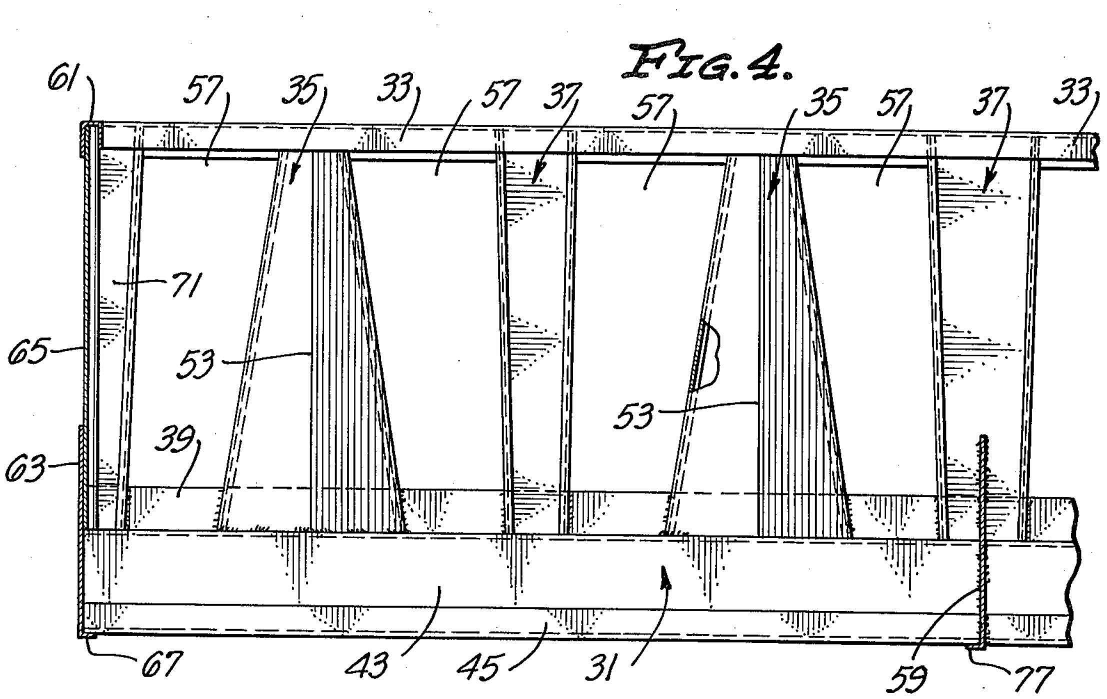
FIG. 4 is a fragmentary sectional view taken generally along line 4—4 of FIG. 3.

As best shown in FIGS. 3–5, the sidewall 25 includes a base member 31, an upper railing 33, a plurality of structural sections in the form of wedges 35, and a plurality of structural members or posts 37. The base member 31 is a strong, metal, structural member and may be, for example, of the cross sectional configuration shown in FIG. 3. In the form shown in FIG. 3, the base member 31 is integral and includes a generally vertical flange 39, a generally horizontal leg 41, a generally vertical leg 43, and an outwardly opening angle section 45. The base member 31 extends continuously for the full length of the container 13 and may be entirely integral or comprise one or more sections welded together. The upper railing 33 in the embodiment illustrated is in the form of a downwardly opening channel which is welded to and receives the upper ends of the wedges 35 and the members 37.

In the embodiment illustrated, each of the wedges 35 includes a pair of plates 49 and 51 welded at their lower edges to the leg 41 of the base member 31 and at their upper edges to the upper railing 33. The plates 49 and 51 have confronting and engaging beveled edges which define an apex or relatively narrow edge 53 of the wedge. The plates 49 and 51 slope inwardly of the bale receiving space 29 as they extend downwardly and intersect to form an acute angle. If desired, the plates 49 and 51 may b welded together along the apex 53. If the plates 49 and 51 abut or are welded together along the apex 53, they become mutually supporting, and they provide a strong structure. The apex 53 extends inwardly as it extends downwardly as best seen in FIG. 3. The angle formed by the apex 53 and the leg 41 may vary but, in the embodiment illustrated, is approximately 60°. Each of the plates 49 and 51 also has a short flange 55 extending along its outer edge for the full length thereof.

The term "wedge" is not used herein in a geometric sense. For example, the apex 53 need not be a line or sharp edge but could have some width defined, for example, by juxtaposing unbeveled edges of the plates 49 and 51. The wedges 35 are open and substantially defined by the plates 49 and 51; however, other structures which would provide structural strength and a sloping, relatively narrow edge for good bale support and retention could also be used.

In the embodiment illustrated, each of the members 37 is of generally channel-shaped configuration with the channel opening inwardly. In the embodiment illustrated, the members 37 are of reduced dimensions near the lower edges thereof as best seen in FIG. 4. The members 37 are welded at their upper and lower edges to the upper railing 33 and to the base member 31, respectively. As shown in FIG. 5, the members 37 do not project inwardly nearly as far as the apices of the wedges 35.

In the embodiment illustrated, the wedges 35 and the members 37 are arranged in an alternating pattern along the base member 31. The members 35 and the wedges 37 are spaced to define a plurality of openings 57 (FIG. 4). Each of the openings 57 extends from the upper railing 33 downwardly to the flange 39 of the base member 31. Each of the openings 57 is sized so as to receive the head of a steer so that the animal can eat from the bale 15 of hay within the space 29. The number of the openings 57 should be sufficient to feed as large a number of livestock as possible at one time. In the embodiment illustrated, each of the openings 57 narrows as it extends downwardly; however, this geometry is not essential.

The number and specific arrangements of the wedges 35 and the members 37 can be varied by those skilled in the art. For example, the members 37 may be omitted entirely, if desired, and only the wedges 35 utilized. Preferably, the apices 53 of the wedges 35 of the sidewall 25 are all substantially parallel. Preferably, the apices 53 of the sidewalls 25 and 25*a* define first and second planes, respectively, which would hold a cylindrical bale with its axis substantially horizontal. Although the apices 53 could be axially offset from the apices 53*a*, in the embodiment illustrated, they are directly opposite as shown in FIG. 5.

The number of the wedges 35 can be varied depending upon the results desired. Thus, for maximum strength and holding action on the bales 15, the number of wedges 35 could be increased.

The sidewalls 25 and 25*a* are held together by the end walls 27 and 27*a* and by an appropriate number of cross braces 59. The end walls 27 and 27*a* may be substantially identical, and accordingly, only the back end wall is described in detail herein.

The end wall 27 includes an upper railing 61, a bottom plate 63 and a plurality (three being illustrated in FIG. 2) of vertical posts 65 welded to, and extending between, the railing 61 and the bottom plate 63. The bottom plate 63 is welded or otherwise suitably affixed to the ends of the base members 31 and 31*a* and may include a flange 67 (FIG. 4) which underlies the base members. The upper railing 61 is in the form of a downwardly opening channel and is welded or otherwise suitably affixed to the upper railings 33 and 33*a*.

In the embodiment illustrated, the posts 65 are identical to the members 37, although other configurations could be employed. As best shown in FIG. 2, the posts 65 are spaced to define additional openings 69 which may be for the same purpose as the openings 57. As shown by way of example in FIG. 3, the lower ends of the post 65 may terminate in substantially the same plane as the leg 41 of the base member 31.

In the embodiment illustrated, the feeder 11 also includes one corner post 71 (FIG. 5) located at each of the four corners of the haying feeder 11. Each of the corner posts 71 may be identical. Although the corner posts 71 may be of different constructions, in the embodiment illustrated, each of the corner posts is in the form of an inwardly opening relatively large angle with each leg of the angle terminating in relatively smaller angles 73 (FIG. 5).

The corner post 71 shown in section in FIG. 5 is welded to the leg 41 of the base member 31, the bottom plate 63, and the upper railing 33 and 61. The other corner posts 71 are similarly attached to corresponding members.

The sidewalls 25 and 25*a* are generally vertical, but slope outwardly slightly as they extend upwardly. The upper railings 33, 33*a*, 61 and 61*a* lie in the same horizontal plane and define the open upper end of the bale receiving space 29. The legs 41 and 41*a* preferably lie in the same horizontal plane.

The haying feeder 11 illustrated by way of example in FIG. 1 includes two of the cross braces 59. Each of the cross braces 59 is identical and extends between generally oppositely located members 37 and 37*a* as shown in FIG. 3. The cross brace 59 has an upper edge 75 which lies substantially below the upper railings 61 and 33, i.e., substantially below the open upper end of the bale receiving space 29. The upper edge 75 terminates sufficiently below the open upper end of the space 25 so as not to interfere with the deposit of the bale 15 in the space 29. In the embodiment illustrated, the upper edge 75 lies along a line which is approximately one-fourth of the way from the leg 41 to the upper end of the railings 33 and 33*a*. The cross brace 59 also extends downwardly between the vertical legs 43 and 43*a* and terminates downwardly in a short horizontal leg 77.

In the embodiment illustrated, each of the cross braces divides the feeder 11 into modules. As shown in FIG. 3, the cross braces 59 divide the bases 31 and 31*a* into sections which are welded together to thereby interconnect the adjacent modules. The cross braces 59 are identical to the end plate 63 so that, when the desired length is reached, the posts 65 can be welded thereto to form the end wall.

The space between the angle sections 45 and 45*a* may be open as shown in FIG. 5 or may be used to support boards or other flooring members 79 as shown in phantom lines in FIG. 3.

In use of the haying feeder 11, large cylindrical bales weighing, for example, 1500 lbs. each may be deposited into the bale receiving space 29 from above. The haying feeder 11 shown in FIG. 1 will hold three of the large bales 15. Each of these bales is cylindrical with its axis extending longitudinally of the haying feeder 11. Each of the bales 15 engages and is primarily supported by the wedges 35 and 35*a*. The relatively sharp apices 53 are forced against and into the table 15 by the enormous weight of the bale with the result that portions of the wedges interlock with the bale. This interlocking holds the bale 15 tightly in position when the haying feeder is being tranported in a loaded condition from one location to another. Also of importance is the fact that the wedges 35 provide substantial strength. This is necessary not only because of the weight of the bales, but because the bales are dropped into the space 29 from above. Accordingly, the wedges 35 must be effective in withstanding dynamic as well as static loading.

Livestock can feed on the bales 15 by inserting their heads through the openings 57, 57*a*, and 69. As the hay is consumed, it gradually slides down the apices 53 so that hay is always present at the openings.

The haying feeder may be constructed by welding together seven separate parts. Any number of modules may further be welded together to form a desired unit for dispensing round hay bales varying from 1000 lbs. to 4500 lbs. Each module is separate and complete for containing one round bale within the preceding weight range.

In summary, with the introduction of a new hay baling concept that cattle will only have to be fed once a week, it has become necessary to search for a new system wherein such bales may be fed to eliminate waste. The haying feeder of this invention introduces a modular approach wherein units can be constructed for dispensing from one to four or even more bales at the same time. The uniqueness of the modular feeder includes the wedges 35 which may be formed of 14 gauge sheet metal broken triangularly into a side panel designed for the proper strength and wedging of bales in a manner to prevent shifting or rolling during transport and feeding. A modular unit can be placed on any standard farm rubber tired trailer designed for proper weight stresses.

Although exemplary embodiments of the invention have been shown and described, many changes, modifications and substitutions may be made by those having ordinary skill in the art without necessarily departing from the spirit and scope of this invention.

I claim:

1. A haying feeder for feeding livestock adapted to hold at least one large bale of hay comprising:

a peripheral wall at least substantially circumscribing a space into which the bale can be deposited, said space having a completely open upper end to permit the bale to be deposited in said space from above;

said peripheral wall including first and second generally opposed wall portions;

each of said wall portions including at least one strong structural section, at least one of said structural sections lying intermediate the ends of the associated one of said wall portions;

each of said structural sections having an inner surface which slopes inwardly as it extends downwardly, said inner surfaces of said structural sections being adapted to engage and at least partially support the bale in said space; and said peripheral wall having a plurality of openings therein, each of said openings being of sufficient size to receive the head of livestock whereby said openings make the bale in said space accessible to livestock.

2. A haying feeder as defined in claim 1 wherein each of said wall portions include at least two of said structural sections, and first and second of said openings being intermediate the structural sections of said first and second wall portions, respectively.

3. A haying feeder as defined in claim 1 wherein said surface of at least a first of said structural sections is relatively sharp.

4. A haying feeder as defined in claim 1 wherein at least a first of said strong structural sections includes first and second plates at least substantially engaging along confronting edges to define a wedge with said surface of said first structural section being defined by the apex of said wedge.

5. A haying feeder as defined in claim 1 wherein said strong structural sections are first structural sections, each of said wall portions including second structural sections, said surfaces of said first structural sections of each of said wall portions projecting inwardly beyond the second structural sections of the same wall portion.

6. A haying feeder as defined in claim 5 wherein each of said first structural sections substantially defines a wedge with said surfaces defining apexes of said wedges, respectively, said first wall portion includes an upper railing and a base beneath the railing, said first and second structural sections of said wall portion being coupled to and extending between said upper railing and said base, and a wheeled trailer, said peripheral wall being carried by said trailer.

7. A haying feeder as defined in claim 1 including a cross brace extending between said first and second wall portions and affixed thereto, said cross brace having an upper end lying substantially beneath the open upper end of said space.

8. A haying feeder for feeding livestock adapted to hold at least one large bale of hay comprising:

first and second spaced sidewalls, each of said sidewalls including an upper railing, means defining a strong base beneath such upper railing, and a plurality of wedges coupled to and extending between said upper railing and the base;

means for interconnecting said sidewalls with said sidewalls extending generally upwardly and in spaced relationship to thereby define a bale receiving space;

each of said wedges having a relatively narrow surface which extends inwardly into the bale receiving space as it extends downwardly;

the bale receiving space being adapted to receive the bale of hay with the bale engaging at least some of said relatively narrow surfaces and being at least partially supported thereby; and each of said sidewalls having a plurality of openings therein, each of said openings being of sufficient size to receive the head of livestock whereby said openings make the bale in said bale receiving space accessible to livestock.

9. A haying feeder as defined in claim 8 wherein at least some of said wedges of said first sidewall are spaced apart, at least some of said openings being intermediate said wedges.

10. A haying feeder as defined in claim 9 wherein at least some of said wedges includes first and second plates attached adjacent their lower ends to an adjacent region of the base and attached adjacent their upper ends to the associated upper railing, said first and second plates at least substantially engaging along confronting edges thereof to define said relatively narrow surface.

11. A haying feeder as defined in claim 10 wherein said means for interconnecting said sidewalls includes first and second end walls and at least one cross brace extending between said first and second sidewalls and affixed thereto, said bale receiving space having a completely open upper end, said cross brace having an upper end lying substantially beneath the open upper end of said bale receiving space.

* * * * *